United States Patent
Blanpain et al.

(10) Patent No.: US 6,610,769 B1
(45) Date of Patent: Aug. 26, 2003

(54) CARPET BACKING ADHESIVE AND ITS USE IN RECYCLING CARPET

(75) Inventors: Peter R. Blanpain, Charlotte, NC (US); Richard L. Scott, Cohutta, GA (US)

(73) Assignee: BASF Corporation, Southfield, MI (US)

( * ) Notice: Subject to any disclaimer, the term of this patent is extended or adjusted under 35 U.S.C. 154(b) by 208 days.

(21) Appl. No.: 09/609,249

(22) Filed: Jun. 30, 2000

(51) Int. Cl.$^7$ ................................................ C08K 3/26
(52) U.S. Cl. ................ 524/426; 156/72; 156/244.24; 428/95; 428/97; 428/343; 428/355; 524/425; 524/446; 524/427; 524/430; 524/437; 524/493; 524/445; 524/522
(58) Field of Search ............................... 524/425, 426, 524/427, 430, 437, 493, 522, 445, 446; 156/72, 244.24; 428/95, 97, 343, 355 BL

(56) References Cited

U.S. PATENT DOCUMENTS

| | | | |
|---|---|---|---|
| 2,244,703 A | | 6/1941 | Hubbuch |
| 2,607,714 A | | 8/1952 | Smucker |
| 2,749,313 A | | 6/1956 | Williams et al. |
| 2,872,420 A | | 2/1959 | Kruyff |
| 2,880,186 A | * | 3/1959 | Barth ........................ 524/501 |
| 2,921,038 A | | 1/1960 | Gunther |
| 3,119,720 A | | 1/1964 | Stiles et al. |
| 3,338,858 A | * | 8/1967 | Strasser et al. ............. 524/114 |
| 3,475,362 A | * | 10/1969 | Romanick et al. .......... 524/511 |
| 3,484,338 A | * | 12/1969 | Britton et al. .............. 428/462 |
| 3,487,032 A | * | 12/1969 | Guziak et al. ............... 524/26 |
| 3,513,121 A | * | 5/1970 | Heaton ....................... 524/501 |
| 3,546,059 A | | 12/1970 | Isgur et al. |
| 3,663,476 A | | 5/1972 | Murphy |
| 3,699,069 A | * | 10/1972 | Peaker ........................ 524/460 |
| 3,743,612 A | * | 7/1973 | Vial ............................ 521/69 |
| 3,753,941 A | * | 8/1973 | Teumac et al. ............. 524/822 |
| 3,756,974 A | * | 9/1973 | Buchheim et al. .......... 524/458 |
| 3,759,860 A | * | 9/1973 | Peaker ........................ 524/167 |
| 3,843,321 A | | 10/1974 | Drelich |
| 4,009,310 A | | 2/1977 | Scobbo |
| 4,036,804 A | * | 7/1977 | Hirai et al. .................. 524/575 |
| 4,191,799 A | | 3/1980 | Gruber |
| 4,206,007 A | * | 6/1980 | Force ........................... 156/72 |
| 4,272,426 A | * | 6/1981 | Feast .......................... 524/813 |
| 4,331,738 A | * | 5/1982 | Kuan .......................... 428/494 |
| 4,374,884 A | | 2/1983 | Kwok et al. |
| 4,471,082 A | | 9/1984 | Kwok et al. |
| 4,480,078 A | * | 10/1984 | Gujarathi ..................... 526/95 |
| 4,731,143 A | | 3/1988 | Cross |
| 4,798,644 A | | 1/1989 | Scott et al. |
| 5,015,713 A | | 5/1991 | Blanpain et al. |
| 5,039,764 A | | 8/1991 | Steinwand |
| 5,055,139 A | | 10/1991 | Personette |
| 5,093,449 A | | 3/1992 | Durney Cronin et al. |
| 5,094,912 A | | 3/1992 | Deibig et al. |
| 5,104,923 A | | 4/1992 | Steinwand et al. |
| 5,230,473 A | | 7/1993 | Hagguist et al. |
| 5,240,530 A | | 8/1993 | Fink |
| 5,336,428 A | | 8/1994 | Kaplan et al. |
| 5,336,755 A | | 8/1994 | Pape |
| 5,354,800 A | | 10/1994 | Suzuki et al. |
| 5,358,981 A | | 10/1994 | Southwick |
| 5,366,998 A | | 11/1994 | Schwartz, Jr. |
| 5,444,118 A | * | 8/1995 | Tsuruoka et al. ............ 524/828 |
| 5,466,411 A | | 11/1995 | Butterfass et al. |
| 5,468,422 A | | 11/1995 | Khouzam et al. |
| 5,535,945 A | | 7/1996 | Sferrazza et al. |
| 5,556,572 A | | 9/1996 | Nishinaka et al. |
| 5,628,832 A | | 5/1997 | Graham et al. |
| 5,629,047 A | | 5/1997 | Sharma et al. |
| 5,637,644 A | | 6/1997 | Tsuruoka et al. |
| 5,648,420 A | | 7/1997 | Fujiwara et al. |
| 5,656,689 A | | 8/1997 | Fujiwara et al. |

(List continued on next page.)

FOREIGN PATENT DOCUMENTS

| | | | |
|---|---|---|---|
| DE | 4315875 | 11/1994 | |
| EP | 0316676 | 11/1988 | |
| EP | 0518004 | 12/1992 | |
| EP | 0 565 891 A1 | 3/1993 | ......... C08F/236/04 |
| EP | 0538625 | 4/1993 | |
| EP | 0547533 | 6/1993 | |
| EP | 0576128 | 12/1993 | |

OTHER PUBLICATIONS

English Abstract for XP002183949 & JP 09 031111 A.
Blackly, "Latex Carpet–Backings," *Latex and Textiles*, Section 19.4, pp. 359–365.
Ray et al., "Recycling of Nylon Carpeting," University of Wisconsin Chemical Engineering 540, May 6, 1997, pp. 1–13.
Recycling of Contaminated an Mixed Post Industrial and Post Consumer Plastics Brochure, Herbold Zerkleinerungstecnik GmbH, Meckesheim, Germany.
Stamper, "An Overview of Carpet Laminates," Carpet Manufacturing Conference, Dalton, Georgia, May 23–24, 1995, pp. 1–21.
Pending U.S. patent application Ser. No. 08/711,883.

*Primary Examiner*—Judy M. Reddick

(57) ABSTRACT

An adhesive useful in making recyclable carpet is prepared from a copolymer dispersion and a filler. The copolymer dispersion is prepared in an emulsion polymerization of a mixture of monomers comprising styrene, butadiene, an alkylacrylic acid monomer, in which the alkyl radical of the alkylacrylic acid monomer is a $C_1$ to $C_6$ branched or unbranched hydrocarbyl radical, and a combination of a second ethylenically unsaturated monocarboxylic acid with an ethylenically unsaturated dicarboxylic acid, in which the alkylacrylic acid monomer is present in a quantity predominating the combination of the second ethylenically unsaturated monocarboxylic acid with the ethylenically unsaturated dicarboxylic acid. The adhesive can be completely removed from the face fibers by applied shear in the presence of aqueous alkaline solution. Recyclable carpets made with the adhesive exhibit high delamination strength, both when wet and when dry.

20 Claims, No Drawings

U.S. PATENT DOCUMENTS

| | | |
|---|---|---|
| 5,681,952 A | 10/1997 | Sifniades et al. |
| 5,684,052 A | 11/1997 | Krishnan et al. |
| 5,698,044 A | 12/1997 | Graham et al. |
| 5,722,603 A | 3/1998 | Costello et al. |
| 5,728,741 A | 3/1998 | Zegler et al. |
| 5,840,773 A | 11/1998 | Booij et al. |
| 5,869,654 A | 2/1999 | Sifniades et al. |
| 5,889,142 A | 3/1999 | Mohajer et al. |
| 5,916,410 A | 6/1999 | Goulet et al. |
| 5,929,234 A | 7/1999 | Sifniades et al. |
| 5,932,724 A | 8/1999 | Sifniades et al. |
| 6,458,230 B1 * | 10/2002 | Rupaner et al. ............ 156/155 |

\* cited by examiner

CARPET BACKING ADHESIVE AND ITS USE IN RECYCLING CARPET

BACKGROUND OF THE INVENTION

1. Field of the Invention

This invention relates to adhesives for carpet backing which exhibit high delamination strength, both when wet and when dry. More specifically, the adhesives of this invention employ a copolymer dispersion of styrene, butadiene, and a mixture of ethylenically unsaturated carboxylic acid monomers. The adhesives are used to make recyclable carpets in which the adhesive can be completely separated from the carpet fibers, and the fibers re-used.

2. Description of Related Art

Carpet, particularly nylon carpet, is the floor covering of choice in many households and businesses in the United States and throughout the world. Unfortunately, carpet has a limited lifespan and must eventually be replaced, with the resultant used carpet waste generally being sent to landfill. Over recent years, the amount of carpet sent for disposal in the United States alone has increased to about 1.5 million tons per year. These vast quantities of carpet waste are burdensome to landfill capacity and have a negative impact on the environment. Furthermore, most carpet is made with nylon as the face fiber, a material that is relatively expensive. The quantity of used carpet discarded every year amounts to a loss of billions of dollars in potentially reusable nylon fiber.

To reduce the impact of used carpet on the environment, and to reclaim some of the financial loss due to discarding of fibers and other useful carpet material waste, carpet recycling would appear to be a logical solution. Recycling carpet, however, is difficult because its three major components are chemically and physically diverse. Most carpet consists of about 20–50 weight percent face fiber, the remainder being backing materials, commonly polypropylene, and adhesive which attaches the carpet fiber to the backing material. The adhesive typically comprises a carboxylated styrene-butadiene (XSB) latex copolymer, and an inorganic filler like calcium carbonate.

To recycle carpet, the face fibers are typically separated from the adhesive and backing to be reprocessed into new products or to be chemically recycled. Various methods for the mechanical removal of carpet fiber have been used. These methods disadvantageously result in low yield of the recycled carpet fiber. For example, U.S. Pat. No. 5,240,530 discloses a method of grinding carpet to a fiber length of less than about one-quarter inch and washing in a water bath to allow the various materials of the carpet to be separated by density.

In a further example, U.S. Pat. No. 5,230,473 describes a method for disintegrating, separating, and segregating whole carpet by loosening and debonding a latex/filler binder system by repeated application of highly pressurized fluids consisting of air, water, heated air, steam, and chemical solutions, and repeated stripping with rotating elements.

In another example, U.S. Pat. No. 5,722,603 describes a method of recovering face fiber from a carpet employing numerous steps of shredding and subjecting it to impact forces to reduce particle size, screen separating and washing the particles, followed by separation in water in a hydrocyclone. The washing operation optionally includes additives to improve the wetting and separation of the particles, such as sodium hydroxide and nonionic surfactant.

Another method to recycle carpet is to dissolve the carpet fiber itself from the remaining components. For example, U.S. Pat. No. 5,840,773 describes a method of extracting nylon from carpet waste by dissolving it in an alcohol-water agent. This method disadvantageously uses large quantities of organic solvent.

In another example, U.S. Pat. No. 5,889,142 describes a method of extracting nylon from carpet waste by dissolving it in a caprolactam-water mixture. This method also requires large quantities of organic solvent.

In a further example, U.S. Pat. No. 5,932,724 describes a method of depolymerizing multi-component waste material which is fed to a reactor as an extruded melt and contacted with superheated steam at high temperature and pressure to provide caprolactam which can be purified and polymerized.

Lastly, U.S. Pat. No. 5,916,410 describes the difficulty of recycling carpet fibers. A process involving organic softener is described.

To overcome problems of low purity and low yield associated with mechanical separation of fiber from carpet backing materials and the use of large quantities of organic chemicals, it is desirable to use a method involving an aqueous solution to remove backing materials from carpet face fibers. It is particularly desirable to develop an adhesive composition for carpet backing which binds carpet face fibers to the backing material, but which can be removed from the face fibers by applying shear in the presence of an aqueous solution, to permit efficient separation of the fibers from the adhesive and backing materials.

An adhesive composition must have high adhesive strength when dried to keep the backing and carpet attached, and must retain sufficient strength when wet to prevent premature failure of the carpet by separation of the fibers from the backing, for example during cleaning. However, while conventional adhesives for carpet backing typically have such dry and wet strengths, they are not easily removed from carpet fibers, but typically require extensive mechanical and chemical treatments to be removed. For example, U.S. Pat. No. 4,191,799 discloses a method for coating nylon carpet fiber with an aqueous curable adhesive that may be prepared from a copolymer of styrene, butadiene, and a carboxylic acid-containing monomer, combined with an olefin-grafted mineral oil extender. The adhesive can be prepared as an aqueous alkaline emulsion, but is not easily removed from carpet fibers.

In another example, U.S. Pat. No. 3,546,059 discloses a carpet fiber adhesive that may be prepared from styrene, butadiene, vinylidene chloride, and a functional monomer such as monoethylenically unsaturated carboxylic acid that improves the bonding of the fibers of the composite material. The latex binder is dried at 250° to 400° F.

Further, U.S. Pat. No. 4,009,310 discloses an adhesive for carpet fibers that may be prepared from a polymer of styrene, butadiene, methacrylic acid, and itaconic acid, combined with finely divided calcium carbonate and a thickener. The styrene is about 50 weight percent of the polymer, and the balance is a mixture of the remaining monomers.

In another example, U.S. Pat. No. 5,093,449 describes a latex bonding composition consisting essentially of styrene, butadiene, an ester, and methacrylic acid that improves dry bonding strength of carpet backing.

Thus, it would be advantageous to employ an adhesive for carpet backing that retains strength when wet, for example during cleaning, but can be completely removed by applying shear in the presence of an aqueous alkaline solution, without the use of organic compounds, to completely remove the backing material from the carpet face fiber to allow efficient recycling of carpet face fibers.

It is a technical advantage of this invention to provide such an adhesive. Another advantage of this invention is that it provides a method of using such an adhesive to prepare a carpet with recyclable face fibers, and a method to recycle the face fibers. The adhesive and carpet of this invention overcome the disadvantages of low yield in recovering carpet fibers and of using large amounts of organic solutions in recycling fibers. Further, they retain sufficient strength when wet to prevent premature failure of the carpet.

SUMMARY OF THE INVENTION

The carpet backing adhesive of this invention is prepared preferably using a carboxylated styrene-butadiene copolymer latex compounded with filler and other additives as known to those skilled in the art such as thickeners, foaming agents, and dispersants. The copolymer is prepared by emulsion polymerization and comprises monomers of styrene, butadiene, and an acidic monomer mixture which imparts to the adhesive high dry strength, high wet strength, and the ability to be totally removed from carpet face fibers to prepare a recyclable carpet. The adhesive can be removed from the face fibers by applying shear in the presence of an aqueous solution containing nonionic surfactant. The acidic monomer mixture comprises a mixture of ethylenically unsaturated carboxylic acid monomers. This acidic monomer mixture preferably comprises (1) a first ethylenically unsaturated monocarboxylic acid, and (2) a combination of a second ethylenically unsaturated monocarboxylic acid with an ethylenically unsaturated dicarboxylic acid. In a preferred embodiment, the first ethylenically unsaturated monocarboxylic acid is an alkylacrylic acid monomer, that is present in a quantity predominating the combination of the second ethylenically unsaturated monocarboxylic acid with the ethylenically unsaturated dicarboxylic acid.

In one embodiment, this invention is an adhesive for carpet backing produced as an aqueous dispersion that is compounded with filler.

In another embodiment, this invention provides a method of preparing a recyclable carpet using the adhesive compound to bind carpet backing to the carpet facing.

In another embodiment, this invention is a recyclable carpet which exhibits excellent delamination strength, both wet and dry.

In further embodiments, this invention provides a method of recycling carpet fibers from articles bonded with the adhesive described herein.

In another embodiment, this invention provides the recycled carpet face fibers.

DETAILED DESCRIPTION OF THE INVENTION

Carboxylated styrene-butadiene latex copolymer dispersions (XSB) are conventionally used in the carpet industry for the backing of carpets. Such adhesives are cured or dried to produce a high strength bond between face fibers and backing that is insoluble in water or aqueous alkaline solution, and is difficult to remove from carpet fibers. The delamination strength of carpet to backing in such products depends on the strength of adhesion of the adhesive compound to the face fibers, the strength of adhesion of the adhesive compound to the backing, and the cohesive strength of the adhesive compound itself. The conventional XSB adhesives have high adhesion to face fibers and are difficult to remove completely from the face fibers in a recycling process. For processes operating at ambient temperature and pressure without organic solvents, carpets made with XSB-based adhesives can be recycled only with numerous steps of size reduction by shredding, milling, and sifting, followed by repeated washing and separation of the fibers from the other materials. Such processes are inefficient, have low throughput, are costly in terms of machinery and energy, and may degrade the fibers being recycled.

In the invention described here, an adhesive is made that has excellent dry and wet strength in carpet backing applications and can be efficiently removed from the final product carpet by applying shear to size reduced carpet in the presence of an aqueous solution containing nonionic surfactant. The base polymeric material of this invention may be any polymeric material capable of being produced in the form of a carboxylated latex. For example, the base polymeric material may comprise a styrene-butadiene, styrene-acrylonitrile-butadiene, styrene-acrylic, acrylic, vinyl acrylic, butadiene, or acrylonitrile-butadiene polymer. For carpet backing applications, the preferred polymeric base material is a carboxylated styrene-butadiene having from about or greater than 30 to about or less than 70 weight percent styrene based on monomer weight, more preferably from about or greater than 40 to about or less than 60 weight percent styrene, most preferably from about or greater than 45 to about or less than 55 weight percent styrene.

The adhesive of this invention is preferably prepared from a modified styrene-butadiene latex copolymer compounded with filler, preferably calcium carbonate. The adhesive is not soluble in water or an aqueous alkaline solution. The copolymer is prepared by emulsion polymerization using a mixture of the monomers styrene, butadiene, and an acid monomer mixture comprising (1) a first ethylenically unsaturated monocarboxylic acid, and (2) a combination of a second ethylenically unsaturated monocarboxylic acid with an ethylenically unsaturated dicarboxylic acid. The adhesive may further comprise a thickener such as a polyacrylic acid salt, and other compound additives known to those of skill in the art, such as dispersing agents, foaming agents, and the like.

The adhesive of this invention can be removed from carpet face fibers by applying shear in the presence of an aqueous alkaline solution because of a predominance of alkylacrylic acid monomer in the mixture of acidic monomers used to prepare the modified copolymer. In a preferred embodiment, the portion of monomers containing at least one carboxylic acid group in the total mixture of all monomers used to prepare the copolymer dispersion is preferably about or greater than 5 weight percent to about or less than 18 weight percent, more preferably about or greater than 6 weight percent to about or less than 15 weight percent, and most preferably about or greater than 6.5 weight percent to about or less than 12 weight percent.

In preferred embodiments, the first ethylenically unsaturated monocarboxylic acid monomer used to make the copolymer of this invention is an alkylacrylic acid, $H_2C=CRCO_2H$, in which R is a $C_1$ to $C_6$ branched or unbranched hydrocarbyl radical, more preferably a $C_1$ to $C_3$ branched or unbranched hydrocarbyl radical, most preferably a methyl group. In preferred embodiments, the portion of alkylacrylic acid monomer exceeds the combined portions of the remaining acidic monomers in the acidic monomer mixture, and is preferably about or greater than 4 weight percent to about or less than 14 weight percent of the total mixture of all monomers used to prepare the copolymer dispersion, more preferably about or greater than 5 weight percent to about or less than 12 weight percent, most preferably about or greater than 5.5 weight percent to about or less than 10 weight percent.

The combination of the second ethylenically unsaturated monocarboxylic acid with the ethylenically unsaturated dicarboxylic acid comprises the remaining acidic monomers. Ethylenically unsaturated monocarboxylic acid monomers suitable for this portion of the mixture include acrylic acid, vinyl benzoic acid, and crotonic acid. Ethylenically unsaturated dicarboxylic acid monomers suitable for this portion of the mixture include maleic acid, fumaric acid, and itaconic acid. In preferred embodiments, the combined portion of these monomers is less than the portion of alkylacrylic acid monomer in the acidic monomer mixture used to make the copolymer dispersion. The portion of the second ethylenically unsaturated monocarboxylic acid is preferably from about or greater than 0.25 weight percent to about or less than 3 weight percent of the total mixture of all monomers used to prepare the copolymer dispersion, more preferably about or greater than 1.5 weight percent to about or less than 2.5 weight percent, most preferably about or greater than 1.5 weight percent to about or less than 2.1 weight percent. The portion of the ethylenically unsaturated dicarboxylic acid is preferably about or greater than 0.25 weight percent to about or less than 0.75 weight percent of the total mixture of all monomers used to prepare the copolymer dispersion, more preferably about or greater than 0.35 weight percent to about or less than 0.65 weight percent, most preferably about or greater than 0.4 weight percent to about or less than 0.6 weight percent.

Importantly, the adhesive of this invention exhibits high wet strength for carpet backing because of the predominance of alkylacrylic acid monomer over the remaining acidic monomers in the mixture of monomers used to prepare the copolymer dispersion. The predominance of alkylacrylic acid monomer provides an adhesive, when the copolymer dispersion is compounded with filler, having excellent wet delamination strength, even though it can be completely removed from the carpet face fibers by the application of shear forces in the presence of aqueous alkaline. The adhesive compound is insoluble in water and aqueous alkaline after drying.

The predominance of the alkylacrylic acid monomer over the remaining acidic monomers in the copolymer dispersion produces a network in the dried adhesive that provides high dry strength to the bonded article, and which when wet retains an excellent strength. Without intending to be bound by theory, the alkylacrylic acid monomer distributes throughout the copolymer dispersion particles more than the other monomers because of its higher hydrophobicity, resulting in greater carboxylation within the particles. The adhesive will have high cohesive strength that greatly enhances the pulling away of the adhesive from the face fibers by shear forces. Thus, the face fibers can be recycled in a much more efficient and less costly process using no organic solvent. The distribution of alkylacrylic acid throughout the copolymer enhances the ability of an aqueous alkaline solution of nonionic surfactant to penetrate and wet the fiber-binder interface and assist the complete removal of the adhesive from the carpet face fibers, even though the adhesive remains insoluble in aqueous alkaline.

The incorporation of the acidic monomer mixture into the copolymer of the dispersion allows the dispersion to be produced at about 50% solids content and neutralized at pH about 8, without causing the viscosity of the adhesive to increase to unworkable levels. This cannot be achieved with an adhesive prepared from a copolymer dispersion of styrene, butadiene, and acrylic acid alone, when using acrylic acid at the same total acids level as in this invention.

The dispersions of this invention have a pH of from about 7.5 to about 9.5. Possible neutralizing agents include ammonia, basic salts of alkali metals, alkaline earth metals, sodium hydroxide, calcium hydroxide, and magnesium oxide. To reduce the release of ammonia by the carpet, the preferred neutralizing agents include, but are not limited to, alkali metal salts such as NaOH, KOH, and alkaline earth metal salts such as $Ca(OH)_2$.

Emulsion polymerization is conducted in an aqueous media. Generally, the monomers are dispersed in water with a surfactant. The surfactant is usually anionic or nonionic if the functional species in the polymer contain a negative charge such as carboxylic acid groups. The surfactant may be synthetic such as a sulfate or sulfonate surfactant. These surfactants tend to have long chain alkyl, alkenyl, alkyl ether, or aryl alkyl back bones. Different types of surfactant as previously discussed may be employed alone or in combinations. Useful emulsifiers are listed in a number of texts including McCutcheon's Detergents & Emulsifiers, MC Publishing Co., Princeton, Wis.

The emulsion polymerization may be a batch process in which the entire dispersion of monomers in water is put in a reactor; it may be an incremental process in which a portion of the monomer mixture, emulsifier, and water is added to the reactor and the polymerization is initiated; or it may be continuous using a chain of two or more reactors. The remaining monomers and emulsifiers, if any, may be added to the reactor over a period of time. This may permit the formation of domains within the polymer. The process may be a seeded process in which a small amount usually less than 5% of a seed polymer is added to the reactor prior to initiation to control particle size. In some cases the seed may be formed insitu.

The reaction is initiated by a free radical. The free radical may be generated by the thermal decomposition of a water soluble compound such as a persulfate, or an oil soluble compound such as azobisisobutyronitrile (AIBN). Generally, such polymerizations are hot and are conducted at temperatures from 70° C. to 120° C.

The emulsion may also contain small amounts of an electrolyte. This helps control particle size and helps maintain a charge balance within the emulsion. The emulsion may also contain a sequestering agent, particularly if hard water is used to form the emulsion. Usually it is desirable to modify the molecular weight distribution of the polymer produced. This may be achieved through the use of a modifier or chain transfer agents such as branched or unbranched $C_{8-16}$ alkyl mercaptans, carbon tetrachloride, or other products; alone or in combination, as is well known in the art.

The polymerization may take from about 3 to 16 hours depending on the process used and the reaction conditions.

There are many texts which discuss emulsion polymerization including: D. C. Blackly, *Emulsion Polymerization Theory and Practice*, John Wiley and Sons, N.Y., and Paul J. Flory, *Principles of Polymer Chemistry*, Cornell University Press.

In one embodiment of this invention, the carpet comprises a face fiber tufted into a primary cloth, an adhesive as described above, and optionally a secondary backing cloth. The face fiber may be any material commonly used in carpet manufacturing including, but not limited to, wool, cotton, acrylic, polypropylene, polyester, nylon 6, or nylon 66. The backing material may be any carpet backing material including, but not limited to, cotton, wool, polyethylene, polyester, polypropylene, woven jute, or combinations thereof. The backing material may further comprise a primary backing material which is bound to the face fiber and a secondary backing material which is bound to the primary backing material and may be attached to a floor or a carpet underpad. The secondary backing may be made of the same or different backing material as the primary backing and may be selected from the group of backing materials as described above.

A carpet of the present invention exhibits high dry and wet delamination strength, comparable to that of conventional latex bound carpets. Unlike conventional carpets, however, when a carpet of this invention is subjected to shear forces in the presence of an aqueous alkaline solution, the backing material is easily and completely separated from the face pile fibrous material. This surprising result is achieved even though the adhesive is insoluble in water or aqueous alkaline solution. Preferably, a recyclable carpet will exhibit about or greater than 1 lbs. per two-inch strip wet strength and about or greater than 3 lbs. per two-inch strip dry strength, more preferably about or greater than 2 lbs. per two-inch strip wet strength and about or greater than 5 lbs. per two-inch strip dry strength.

The aqueous alkaline solution of the present invention comprises up to about one percent nonionic surfactant, preferably a linear alkyl polyethylene oxide type, for example LUTENSOL TO-89, for reasons of environmental friendliness.

The adhesive of this invention is also suitable for use in papermaking. The adhesive of this invention is further suitable for use as temporary or removable coating materials for wood, leather, textiles, plastics or metal.

Suitable fibers for the recyclable carpet include all fiber materials customary for nonwoven composites. These include not only synthetic fibers such as viscose, polyester, polyamide, polypropylene, but also fibers of natural origin, staple rayon fibers, cellulose fibers, cotton fibers, and combinations thereof.

Fillers suitable in preferred embodiments of this invention may be organic or inorganic and may be selected from the group consisting of clay, calcium carbonate, hydrated aluminas, silicates, polyethylenes, plastics, and mixtures thereof. In preferred embodiments of this invention, the adhesive comprises about or greater than 100 to about or less than 1000 parts calcium carbonate filler per hundred parts dry copolymer, preferably about or greater than 150 to about or less than 600 parts calcium carbonate filler.

The carpet backing adhesives of this invention may optionally include additives such as foaming agents, pH controllers, flame retardants, wetting agents, dispersing agents, anti-microbial agents, lubricants, dyes, anti-oxidants, and the like, which are well known to those skilled in the art, without loss of the characteristic properties. Further examples of additives known to those of skill in the art include aluminum trihydrate, frothing agents, water softeners, defoamers, and stain resisting compounds.

The recyclable carpet may be produced by the processes known to those of skill in the art, including but not limited to direct coating and roll metering, and knife-coating and lick-roll application, as described in D. C. Blackly, *Latex and Textiles*, section 19.4.2, page 361.

The face fibers of the recyclable carpets of this invention are removed from the recyclable carpet by the steps of size reduction, wet granulation in the presence of an aqueous alkaline solution of a nonionic surfactant, and separating the fibers from the mixture exiting the wet granulator, the separation being done preferably with a hydrocyclone. The complete removal of the adhesive from the carpet face fibers is accomplished without the extensive mechanical separations, dry separations, and washing treatments of current methods.

Size reduction can be accomplished by any conventional industrial shredder, rotary cutter, shear shredder, rotor grinder, or rotor shredding machine. Such shredders may employ, for example, a pair of counter-rotational shafts carrying interleaved cutter discs and cleaning fingers, such as the ST-50 Series of industrial shredders available from Shred-Tech, Ltd., of Cambridge, Ontario, Canada. Another example is an industrial rotary-type shredder. Advantageously, the recyclable carpet of this invention does not require extensive dry separation steps or washing steps of the carpet components to achieve complete separation.

Wet granulation can be accomplished by any conventional industrial wet granulator. For example, a wet granulator that may be employed in the practice of this invention is commercially available from Herbold Zerkleinerungstechnik GmbH of Meckesheim, Germany.

Separation of the fibers from the removed carpet adhesive compound can be accomplished by any commercially available hydrocyclone, an apparatus in which a vortex of water is generated to separate components of mixtures by their relative densities, as described in U.S. Pat. No. 5,722,603.

EXAMPLES

The following examples further describe and demonstrate embodiments within the scope of the present invention. The examples are given solely for the purpose of illustration and are not to be construed as limitations of the present invention, as many variations thereof are possible without departing from the spirit and scope of the invention.

Example 1

Six samples of secondary backed carpet were prepared and tested for wet delamination, dry delamination, and removability of nylon fibers. All six samples were prepared using the same nylon face fibers, polypropylene secondary backing material, and proportions of precoat and adhesive, but varying in the composition of the adhesive, as described in Table 1. Two comparative samples, columns 1 and 6 in Table 1, used a conventional modified styrene-butadiene latex (XSB), which contained no methacrylic acid. A comparative sample of an alkali soluble latex having a high content of methacrylic acid was tested as shown in column 5 in Table 1. The remaining three samples illustrate an embodiment of the invention here, a carboxylated copolymer prepared from the monomers styrene, butadiene, methacrylic acid, acrylic acid, and itaconic acid, in which the acrylic acid was 2.0 weight percent and the itaconic acid was 0.5 weight percent of all monomers, and in which the methacrylic acid was increased from two to six weight percent of all monomers, corresponding to columns 2 through 4 of Table 1. The adhesives of this invention, shown in columns 3 and 4 of Table 1, were insoluble in water and aqueous alkaline.

All six samples of Table 1 were tested for removability of the adhesive from the face fibers by exposure to shear forces in an aqueous alkaline solution containing one weight percent LUTENSOL TO-89 at pH 9.5 to 10. The samples were cut into one square centimeter pieces and treated in a blender in the 1% solution of surfactant for 2–10 minutes, typically about 2 minutes. The fibers were observed under an optical microscope to determine removal of the adhesive.

All six samples were tested for delamination strengths as measured by ASTM D3936-80, using a two inch strip of the recyclable carpet at room temperature. Wet strength was obtained after soaking the strip in water for 30 minutes.

TABLE 1

Adhesive and recyclable carpet delamination strengths

| Adhesive | 1 XSB[1] | 2 | 3 | 4 | 5 Latex[2] | 6 XSB[1] |
|---|---|---|---|---|---|---|
| Methacrylic acid (weight %) | 0 | 2.0 | 4.0 | 6.0 | 14.0 | 0 |
| Dry delamination strength (lbs.) | 7.1 | 6.1 | 6.6 | 7.4 | 6.2 | 6.7 |
| Wet delamination strength (lbs.) | 3.5 | 3.7 | 3.7 | 3.6 | 0.25 | 3.6 |
| Wet strength % retention[3] | 49% | 61% | 56% | 49% | 4% | 54% |
| Removable from nylon fibers[4] | No | No | Partial | Complete | Complete | No |

[1]Conventional carpet backing XSB.
[2]Comparative experimental latex with high methacrylic acid content.
[3]Wet strength ÷ dry strength.
[4]Laboratory shear test, as described, performed in the presence of an aqueous alkaline solution of a nonionic surfactant.

As illustrated in Table 1, the carpets comprising conventional XSB latex demonstrated good wet and dry delamination strengths. These conventional backing adhesives, however, were not removed from the nylon fibers when sheared in aqueous alkaline solution. Conversely, the alkali soluble latex with high methacrylic acid content, although completely removable in aqueous alkaline solution, had poor wet delamination strength.

The samples of recyclable carpet prepared with the carboxylated styrene-butadiene copolymer of this invention show that high wet strength was obtained, even though the adhesive was completely removed from the face fibers by applying shear in the presence of an aqueous alkaline solution.

The carpet samples in this example were prepared with a secondary backing adhesive made according to Tables 2 and 3. The precoat was applied to the carpet and dried, then the adhesive and secondary backing cloth were applied and dried.

TABLE 2

Precoat formulation.

| Component | secondary backing precoat |
|---|---|
| carboxylated latex | 100 parts dry |
| calcium carbonate | 550 |
| foaming agent | 2.0 |
| thickener | 0.30 |
| solids content | to 82–84% |
| application rate | 28 oz/sq.yd. |

TABLE 3

Secondary backing adhesive formulation.

| Component | secondary backing adhesive |
|---|---|
| carboxylated latex | 100 parts dry |
| calcium carbonate | 350 |

TABLE 3-continued

Secondary backing adhesive formulation.

| Component | secondary backing adhesive |
|---|---|
| foaming agent | 0.14 |
| thickener | 0.25 |
| solids content | to 80–82% |
| application rate | 6 oz/sq. yd. |

Example 2

A unitary backing adhesive was made according to Table 4.

TABLE 4

Adhesive unitary backing formulation.

| Component | unitary backing |
|---|---|
| carboxylated styrene-butadiene copolymer latex | 100 parts dry |
| calcium carbonate | 175 |
| foaming agent | 0.38 |
| thickener | 0.12 |
| solids content | to 70–75% |
| application rate | 32 oz/sq. yd. |

Example 3

A recyclable carpet is prepared according to Example 1. The recyclable carpet is size reduced in a shredder and fed to a wet granulator. The adhesive of the recyclable carpet is removed from the face fibers of the carpet by a process of shear in the wet granulator in the presence of an aqueous alkaline solution of a nonionic surfactant. The output of the wet granulator is fed to a hydrocyclone, in which the adhesive-free face fibers are separated from the adhesive and other components of the recyclable carpet.

Other embodiments and uses of the invention will be apparent to those skilled in the art from consideration of the specification and practice of the invention disclosed herein. All documents referenced herein are specifically and entirely incorporated by reference. The specification and examples should be considered exemplary only, with the true scope and spirit of the invention being indicated by the following claims. As will be easily understood by those of ordinary skill in the art, variations and modifications of each of the disclosed embodiments can be easily made within the scope of this invention as defined by the following claims.

What is claimed is:

1. A carpet backing adhesive, comprising:
   (1) a copolymer dispersion prepared by polymerizing monomers comprising:
      (a) styrene;
      (b) butadiene; and
      (c) an acidic monomer mixture comprising:
         (i) an alkylacrylic acid monomer, in which the alkyl radical of the alkylacrylic acid monomer is a $C_1$ to $C_6$ branched or unbranched hydrocarbyl radical; and
         (ii) a combination of a second ethylenically unsaturated monocarboxylic acid with an ethylenically unsaturated dicarboxylic acid;
   wherein the alkylacrylic acid monomer is present in an amount that is greater than a combined amount of the second ethylenically unsaturated monocarboxylic acid and the ethylenically unsaturated dicarboxylic acid; and (2) a filler, in which the adhesive can be completely removed from carpet face fibers by applied shear in the presence of an aqueous alkaline solution of a nonionic surfactant.

2. The adhesive of claim 1, in which the acidic monomer mixture is present in an amount of from about 5 weight percent to about 18 weight percent of the polymerizing monomers.

3. The adhesive of claim 1, in which the acidic monomer mixture is present in an amount of from about 6 weight percent to about 15 weight percent of the polymerizing monomers.

4. The adhesive of claim 1, in which the acidic monomer mixture is present in an amount of from about 6.5 weight percent to about 12 weight percent of the polymerizing monomers.

5. The adhesive of claim 1, in which the alkylacrylic acid monomer is methacrylic acid.

6. The adhesive of claim 1, in which the alkylacrylic acid monomer is present from about 4 weight percent to about 14 weight percent of the polymerizing monomers.

7. The adhesive of claim 1, in which the alkylacrylic acid monomer is present from about 5 weight percent to about 12 weight percent of the polymerizing monomers.

8. The adhesive of claim 1, in which the alkylacrylic acid monomer is present from about 5.5 weight percent to about 10 weight percent of the polymerizing monomers.

9. The adhesive of claim 1, in which the second ethylenically unsaturated monocarboxylic acid is present from about 0.25 weight percent to about 3 weight percent of the polymerizing monomers.

10. The adhesive of claim 1, in which the second ethylenically unsaturated monocarboxylic acid is present from about 1.5 weight percent to about or 2.5 weight percent of the polymerizing monomers.

11. The adhesive of claim 1, in which the second ethylenically unsaturated monocarboxylic acid is present from about 1.5 weight percent to about 2.1 weight percent of the polymerizing monomers.

12. The adhesive of claim 1, in which the ethylenically unsaturated dicarboxylic acid is present from 0.25 weight percent to about 0.75 weight percent of the polymerizing monomers.

13. The adhesive of claim 1, in which the ethylenically unsaturated dicarboxylic acid is present from about 0.35 weight percent to about 0.65 weight percent of the polymerizing monomers.

14. The adhesive of claim 1, in which the ethylenically unsaturated dicarboxylic acid is present from about 0.4 weight percent to about 0.6 weight percent of the polymerizing monomers.

15. The adhesive of claim 1, in which the filler is selected from the group consisting of clay, calcium carbonate, hydrated alumina, silicate, polyethylene, plastic, and mixtures thereof.

16. The adhesive of claim 1, in which the filler is calcium carbonate.

17. A method of preparing a recyclable carpet comprising:

(A) providing carpet face fibers;

(B) providing carpet backing material;

(C) contacting the adhesive of claim 1 with the face fibers or the backing material; and (D) contacting the face fibers with the backing material thereby attaching the face fibers to the backing material with the adhesive.

18. A method to recycle carpet face fibers comprising:

(A) providing a recyclable carpet comprising:

(1) carpet face fibers;

(2) carpet backing material; and (3) the adhesive of claim 1 contacted with the face fibers and the backing material which attaches the face fibers to the backing material;

(B) reducing the size of the recyclable carpet;

(C) treating the size-reduced recyclable carpet with shear in a wet granulator in the presence of an aqueous alkaline solution of a nonionic surfactant of pH about or greater than 9; and (D) separating the carpet face fibers from the mixture resulting from the wet granulator.

19. The method of claim 18, in which the filler is calcium carbonate.

20. The method of claim 18, in which the fibers are separated from the mixture resulting from the wet ganulator by using a hydrocyclone.

* * * * *